United States Patent Office 3,074,794

Patented Jan. 22, 1963

3,074,794

VISIBLE LIGHT BICHROMATE PROCESS AND MATERIAL

Gisela K. Oster and Gerald Oster, both of 36 Grove St., New York, N.Y.

No Drawing. Filed Feb. 12, 1959, Ser. No. 792,727
17 Claims. (Cl. 96—35)

This invention relates to a visible light bichromate process and material.

The bichromate reproduction process is well known and involves the rendering insoluble of irradiated areas of a soluble polymer by a chromium cross-linking.

The starting polymers, which are useful in the bichromate process, are well known in the art and consist of soluble polymers which are capable of being cross-linked into an insoluble form by reduced bichromate. These polymers include gelatin, albumin, casein, polyacrylamide, poly vinyl alcohol, gum arabic and the like. The starting polymer in the form of a flat surface, as for example in the form of a film or layer on a suitable backing and containing a bichromate, such as an alkali metal or ammonium bichromate, is irradiated with an ultra-violet light image. The ultra-violet light irradiated portions of the polymer are rendered insoluble, since the bichromate in these light-struck areas is reduced by the ultra-violet light to a form which, in turn, cross-links the polymer, rendering the same insoluble. The portions of the polymer, which have not been irradiated and which thus are still soluble, are washed away, leaving the insoluble portions. The backing with the remaining insoluble portion may be used as a printing matrix, as, for example, for lithography; or the backing plate, for example, where the same constitutes an etchable metal plate, may be etched in the conventional manner, the insoluble polymer portions protecting the portions of the plate, which the same cover, from the etching liquid so that the liquid selectively etches the areas of the plate which have not been irradiated and from which the soluble polymer has been washed away.

After the etching process the remaining insoluble portions of the polymer may be removed, and the plate may be used as a printing matrix in the conventional manner.

Visible light does not effectively reduce the bichromate, so that the irradiation must be effected with light at least approaching the ultra-violet range. A number of disadvantages and difficulties are, however, encountered with the use of ultra-violet light. Ultra-violet light sources are relatively more expensive and difficult to operate than visible light sources. When using ultra-violet light, it is extremely difficult to project the image. The focusing of the image can only be effected visibly and with a sharp focus in the visible region; it does not necessarily follow that the light will be sharply focused in the ultra-violet region. Additionally, most of the lenses are ground and designed for correction in the visible light range so that severe lens errors may occur in the ultra-violet region. Ultra-violet light is of a shorter wavelength than visible light and thus scatters much more than visible light and has poorer definition and resolving power. Furthermore, in order to effect color reproduction, a relatively cumbersome process is required involving the use of color-separation intermediate negatives.

One object of this invention is effecting the bichromate process, using a visible light image rather than an ultra-violet light image.

A further object of this invention is a material including a polymer and a bichromate, which allows the effecting of the bichromate process with visible light.

These and still further objects will become apparent in accordance with the invention.

We have now discovered that the bichromate process may be effected with visible light if the conventional bichromate material, consisting of a soluble polymer, which is cross-linkable into insoluble form by reduced bichromate, and a bichromate, additionally contains a photo-reducible dye and a material incapable of reducing the dye in the absence of light, but able to reduce the photo-excited dye.

The starting polymer may be any polymer conventionally known or used in the bichromate process, i.e. a soluble polymer which is cross-linkable to an insoluble form by reduced bichromate, as for example gelatin, albumin, polyacrylamide, polyvinyl alcohol, gum arabic, casein and the like.

The bichromate may be any bichromate conventionally used in the bichromate process, as for example sodium bichromate, potassium bichromate, ammonium bichromate, and should be present in the amounts conventionally used, as for example 0.1 to 10% and preferably about 5% of the total material.

The photo-reducible dyes, which may be used in accordance with the invention, comprise any known dyes which are capable of forming a stable system with the reducing material in the absence of light, but which will undergo reduction when irradiated with visible light in the presence of the reduction material. These dyes include rose bengal, phloxine, erythrosine, eosin, fluorescein, acriflavine, thionine, riboflavin, water-soluble and fat-soluble chlorophylls, hematoporphyrin, proflavine, methylene blue, etc. The dyes thus include members of the fluorescein family, the thiazine family and certain acridines and porphyrins. A large number of these dyes are characterized by their fluorescence.

The material which will reduce the photo-excited dye, but yet will form a stable system with the dye in the absence of light, is actually believed to be an electron donor or hydrogen donor, but will be referred to herein as a reducing agent, as its ultimate purpose is the reduction of the dye. Any known reducing agent or material which, in combination with the particular dye in question, will form a stable system in the absence of light, but which will cause reduction of the dye upon irradiation with visible light, may be used. The reduction potential of the reducing agent should, therefore, be less than that necessary to reduce the particular dye in question in the absence of light. These reducing agents and the system of dye and reducing agent are, for example, described in U.S. Patent No. 2,850,445 and U.S. Patent No. 2,857,047.

Additionally included in this group are materials which are not normally considered as reducing agents, in that they normally show no reducing power, but which are capable of reducing the photo-excited dye and thus are reducing agents within the scope of the invention. These materials include chelating agents, such as triethylanolamine, hydroxyethylenediamine, bis (hydroxy ethyl) glycine, other secondary or tertiary amine-chelating agents, such as ethylenediamine, ethylenediamine tetra-actic acid or triacetic acid, diethylene-triamine-pentacetic acid, 1,2-diaminocyclohexane, hydroxy ethyl tris (hydroxypropyl) ethylenediamine, ammoniadiacetic acid, methylaminodiacetic acid, N-phenylglycine, oxalic acid and the like.

The polymer in certain cases, as for example in the case of polyvinyl alcohol, may also act as the reducing agent, and the requirement in the claims calling for a reducing agent includes the case where the reducing agent is the same as the polymer.

The reducing agents must, of course, be incapable of reducing the bichromate per se. If this were to occur, the mere addition of the reducing agent would cause the reduction of the bichromate and the cross-linking and insolubilizing of the polymer. The ease, with which the bichromate is reduced, somewhat depends on its pH. Since in the bichromate process material is generally used within a pH range of 6 to 13, and preferably 8 to 9, the reducing agent should be incapable of reducing the bichromate in this pH range. Thus, it is generally desirable to use reducing agents which have a low reducing power, as for example sodium thiosulphate, or reducing agents which normally have no reducing power, as for example the chelating agents described above or oxalic acid.

The dyes and reducing agents are preferably added to an aqueous solution, from which the film or coating of the polymer is formed. Thus, where the polymer is gelatin, the dye and reducing agent are added to the solution from which the gel is formed, and where the polymer is one of the other polymers conventionally used in the bichromate process, the dye and reducing agent are added to the solution from which the film of the polymer is cast or formed.

The amount of dye and reducing agent is not critical, but should be sufficient to reduce at least a portion of the bichromate, when irradiated with visible light.

In principle, each molecule of photo-reduced dye will, in turn, reduce a bichromate molecule and be regenerated thereby, be further reduced, and so on, so that theoretically only a small amount of dye with respect to the bichromate need be present.

An excess of dye, however, is not detrimental and is often desirable. A stoichiometric amount of reducing agent is theoretically required with respect to the bichromate, but there is no harm in having a smaller amount, though an excess of reducing agent is desirable for practical operation. With an excess of the reducing agent there is an assurance that all of the dye and regenerated dye, required to reduce the bichromate, will be photo-reduced upon irradiation with visible light, whereas, if there is a smaller amount of reducing agent, only the amount of dye which is photo-reduced can act to cause reduction of the bichromate and insolubilization of the polymer.

Except for the addition of the dye and the reducing agent, the bichromate material is prepared in the conventional and well known manner. Thus, for example, in connection with gelatin a solution of gelatin containing bichromate, as for example potassium bichromate, is formed and the same is allowed to gel as, for example, in the form of a flat surface or film over a backing plate, such as an etchable plate. In connection with other polymers, such as albumin, polyacrylamide, polyvinyl alcohol, gum arabic, etc., the solutions are formed in the conventional manner, but additionally containing the dye and reducing agent, and then cast in the form of a film or layer as, for example, on a suitable backing, such as an etching plate.

The polymer containing the dye and reducing agent is photo-sensitive, so the same must be shielded from light of sufficient intensity to reduce the dye as, for example, kept in the dark in the manner of an ordinary photographic emulsion until the desired exposure is effected.

The polymer is exposed to the image in order to effect the photo-reproduction in the identical manner as the conventional bichromate material, except that the irradiation is effected with visible light rather than ultra-violet light. The light source used may be any light source producing light within the visible range, i.e. having a wave length between about 400 and 760 millimicrons. Actually, it is only necessary to irradiate with a wave length which the particular dye absorbs. Since by very definition the dye is a colored substance, this wave length will always be in the visible light range. As a light source, any of the conventional sources of visible illumination may be used, as for example conventional projectors, enlargers, contact printing apparatus or the like. The sensitivity of the material may generally be controlled by a suitable choice of the type and quantity of dye, reducing agent and bichromate, and the system may be made extremely light-sensitive so that only a brief flash with relatively low-intensity light will suffice for the reduction of the bichromate.

In order to produce or reproduce an image, the visible light must be in the form of a visible light image, i.e. have variations in intensity corresponding to the image to be reproduced. This may be effected in any known or desired maner for forming a light image, as for example by irradiating with visible light through a photographic positive or negative transparency, by projecting a transparency, or reflected image; or by passing light through a translucent printed or typewritten sheet or by directly producing an image with a lens or the like. The additonal presence of ultra-violet light does not harm and, in fact, speeds the process. The use of conventional ultra-violet lamps, which additionally emit in the visible range, is sometimes preferred. The ultra-violet light directly reduces the bichromate, and the visible light reduces the same through the dye.

After the irradiation, the portions of the polymer which are not cross-linked may be washed away with water or other liquids, leaving insoluble polymer at the areas which had been light-struck, in the same manner as a conventional bichromate process. After the irradiation, the plate or the backing containing the irradiated polymer, in accordance with the invention, may be further treated in the conventional manner, making sure, however, that the portions of the polymer which are still soluble are removed, as for example by washing out, before further exposing the material to visible light. Polymers so formed may be directly used for lithography or the plate may be etched or the like.

In the case of photographic reproduction and similar use, where a broad color-sensitivity is necessary, at least three photo-reducible dyes should be incorporated in the polymer, each having an absorption maximum for a different one of the primary colors. Thus, for example, acriflavine, rose bengal and methylene blue may be used for the dyes.

The bichromate process and material, in accordance with the invention, are excellently suited for color reproduction and alleviate many of the disadvantages encountered where ultra-violet light was used. In order to control the color-sensitivity of the plate, it is merely necessary to choose a suitable dye or dye combination.

In addition to the use in the conventional bichromate processes, the polymer containing the bichromate, the photo-reducible dye and reducing agent, in accordance with the invention, may be used for any other photoreproduction purpose, as for example described in U.S. Patent No. 2,857,047. In this patent the light-struck areas are polymerized, whereas in accordance with the instant invention the light-struck areas are insolubilized so that for many practical purposes the end result is the same. Thus, for example, the process and material in accordance with the invention may be used for photosensitive emulsions, three-plate color photography systems, radiographic photography, printing matrices, etched plates, color-printing plates, lithographic plates, stencils, silk screens, master forms for spirit reproductions, raised tranfer stamps (rubber-type stamps) and the like in the identical manner as described in said patent. Further, the process and material in accordance with the invention may be used for making printed circuits.

For this purpose, for example, an insulating plate, such as a thermo-setting resin plate of, for example, phenyl formaldehyde or the like, may be coated with a metallic conductive material and thereupon coated with a polymer material in accordance with the invention, containing the bichromate, photo-reducible dye and reducing agent. Upon illuminating with an image corresponding to the circuit to be formed, the illuminated areas are insolubilized, and the rest of the polymer may be washed away. The washed-away portions will leave exposed the metallic conductive layer, which may then be removed, as for example by etching, leaving the metal coating corresponding to the circuit desired. This may then be directly used, or used after removal of the insoluble polymer coating.

The following examples are given by way of illustration and not limitation:

*Example 1*

A solution was made up, containing 5% gelatin, 4% potassium bichromate, 0.01% methylene blue, 0.1% triethanolamine and the balance water.

The solution was cast as a film on a flat copper plate and allowed to gel. After gelling, a microphotography of a printed page was projected on the surface of the plate with a 500 watt slide-projector at a distance of about 3 feet for a period of time of about 10 minutes.

Thereafter, the plate was washed with ordinary water so that only portions of the gel corresponding to the exposed portions remained. The plate was then etched with an acid etching bath and after etching, the remaining portions of the insoluble gel were removed in the conventional manner and the plate inked and used for printing.

*Example 2*

Example 1 was repeated; however, using in place of the methylene blue the following photo-reducible dyes in turn: rose bengal, phloxine, erythrosine, eosin, fluorescein, acriflavine, thionine, riboflavin, water-soluble and fat-soluble chlorophylls, hematoporphyrin, proflavine, and in place of the triethanolamine the following materials in turn: sodium thiosulfate, hydroxyethylenediamine, bis (hydroxy ethyl) glycine, ethylenediamine tetracetic acid, ethylenediamine triacetic acid, diethylenetriamine-pentacetic acid, 1,2-diaminocyclohexane tetracetic acid, hydroxy ethyl tris (hydroxypropyl) ethylenediamine ammonia-diacetic acid, methylaminodiacetic acid, N-phenylglycine and oxalic acid.

In each case, substantially identical results were obtained to those obtained in Example 1.

*Example 3*

A solution was made up containing 10% polyvinyl alcohol, 4% potassium bichromate, 0.01% methylene blue, 1% triethanolamine and the balance water. The solution was coated on a polished aluminum sheet and dried, forming a dry film about 0.01 mm. thick.

Two other identical aluminum sheets were made up, but in the solution used to coat one the methylene blue was replaced with erythrosine, while in the solution used to coat the other the methylene blue was replaced with proflavine. Each of the sheets was illuminated in turn for 3 minutes with a 500 watt tungsten lamp through a color negative transparency. After the exposure, the sheets were washed in a 5% phosphoric acid solution, which washed away the portions of the polyvinyl alcohol which were still soluble and impaired the ink retentivity of the exposed surface of the aluminum. Thereafter, the plates were used for offset color printing, the sheet coated with the solution containing the methylene blue, being inked with a cyan colored ink, the sheet coated with the solution containing the proflavine being inked with a yellow ink and the sheet coated with the solution containing the erythrosine being inked with a magenta ink. The printing was effected on white paper with the usual offset process, with the inked image being transferred from the sheet to a rubber roller and then onto the paper, with the three-inked images being super-imposed one over the other on the paper. A true printed color positive of the color negative transparency resulted.

*Example 4*

Example 3 was repeated, using however, in place of the polyvinyl alcohol, polyacrylamide and gum arabic in turn. Identical results were obtained.

*Example 5*

An aqueous solution was made up, containing 5% casein, 7% ammonium bichromate and 5% ethylene diamine tetraacetic acid.

A white paper was soaked in the solution and allowed to dry. A 1% solution of methylene blue was used as an ink to print small (0.01 mm. diameter) dots in a regular array, closely spaced on the treated paper. Similarly, a yellow ink made up of a 1% solution of proflavine was used to print similar dots, but out of register with the first dots. Similarly, a third ink made of 1% solution of erythrosine was used to print a third array of dots, out of register with the first two arrays of dots. The dots were so closely spaced together that the paper appeared almost black when viewing the same. The paper was exposed for ½ a minute to a color negative transparency, using a 500 watt tungsten lamp. After washing with water, a faithful color positive print of the original color negative was obtained.

*Example 6*

The coated sheet of Example 5, printed with the dots, is exposed in an ordinary camera for a minute to a sunlit landscape through an F–2 lens. After the exposure, the exposed paper is pressed with a roller against a moist white absorbent paper sheet. A true color photograph is obtained on the white sheet.

If the sheet, in place of being moistened with water, is moistened with the original solution (without the dots, however), the color photograph would be automatically set or fixed upon exposure to ordinary light.

*Example 7*

An aqueous solution was made up, containing 8% gelatin, 1% ammonium bichromate, 12% triethanolamine. The solution was coated on three separate cellophane sheets, one of which had been pre-coated with 0.01% solution of methylene blue containing 1% of a cyancoupler (diketohydrineden), the other pre-coated with a 0.01% solution of proflavine with a yellow coupler (1% acetoacetic ester) and the third pre-coated with 0.01% solution of erythrosine with a magenta coupler (1% methylene cyanide).

Three layers were super-imposed and exposed with 35 mm. color transparency (positive), using a 300 watt slide projector at a distance of 3 feet for 2 minutes. Thereafter, the three layer composite was developed with paraphenylene diamine (5% solution), and there was obtained a color transparency corresponding to the original. It should be noted that an excess of the triethanolamine was present so that the color of the photo-reduced dye would be permanently destroyed.

While the invention has been described in detail with reference to certain specific embodiments, various changes and modifications, which fall within the spirit of the invention and scope of the appended claims, will become apparent to the skilled artisan. The invention is, therefore, only intended to be limited by the appended claims.

We claim:

1. In the bichromate photographic reproduction process, in which a soluble polymer cross-linkable into insoluble form by reduced bichromate and containing a bichromate is irradiated with a light image to thereby selectively render the irradiated portions insoluble, the improvement, which comprises using the soluble polymer additionally containing a dissolved photo-reducible dye and a reducing agent having a reduction potential incapable of reducing said bichromate and incapable of reducing said dye in the absence of light, but of sufficient strength to reduce substantially only the photo-excited dye, said dye, bichromate and reducing agent forming a stable system in the absence of light which undergoes reduction of the dye upon exposure to visible light, said dye and reducing agent being present in sufficient amount so that when irradiated with visible light the dye will be reduced and the reduced dye will in turn reduce at least a portion of said bichromate and effecting said irradiation with a visible light image of sufficient intensity and duration to photo-excite at least a portion of said dye.

2. Process according to claim 1, in which said polymer is a member selected from the group consisting of gelatin, albumin, polyacrylamide, polyvinyl alcohol, casein and gum arabic.

3. Improvement according to claim 1, in which said photo-reducible dye is a member selected from the group consisting of rose bengal, phloxine, erythrosine, eosin, fluorescein, acriflavine, riboflavin, proflavine, azur C, water-soluble and fat-soluble chlorophylls and hematoporphyrin.

4. Improvement according to claim 1, in which said reducing agent is a chelating agent.

5. Improvement according to claim 1, in which said reducing agent is a member selected from the group consisting or triethanolamine, hydroxyethylenediamine, bis (hydroxy ethyl) glycine, ethylenediamine, ethylenediamine tetracetic acid, ethylenediamine triacetic acid, diethylene-triamine-pentacetic acid, 1, 2-diaminocyeclohexane, tetracetic acid, hydroxy ethyl tris-(hydroxypropyl) ethylenediamine ammonia-diacetic acid, methylaminodiacetic acid, N-phenylglycine and oxalic acid.

6. Improvement according to claim 1, in which said polymer is gelatin.

7. A process according to claim 1, which comprises washing out the portions of said polymer remaining soluble after said irradiation.

8. Process according to claim 1, which includes irradiating with substantially identical color photo images at least three separate layers of said polymer, each containing a different photo-reducible dye, sensitive to a different primary color.

9. A mixture comprising a water-soluble polymer crosslinkable into insoluble form by reduced bichromate, containing a bichromate, a dissolved photo-reducible dye and a reducing agent having a reduction potential incapable of reducing said bichromate and incapable of reducing substantially only said dye in the absence of light, but of sufficient strength to reduce the photo-excited dye, said dye, bichromate and reducing agent forming a stable system in the absence of light which undergoes reduction of dye upon exposure to visible light, said dye and reducing agent being present in sufficient amount so that when irradiated with visible light the dye will be reduced and the reduced dye will in turn reduce at least a portion of said bichromate.

10. Mixture according to claim 9, in which said polymer is a member selected from the group consisting of gelatin, albumin, polyacrylamine, polyvinyl alcohol and gum arabic.

11. Mixture according to claim 9, in which said photo-reducible dye is a member selected from the group consisting of rose bengal, phloxine, erythrosine, eosin, fluorescein, acriflavine, riboflavin, proflavine, azur C, water-soluble and fat-soluble chlorophylls and hematoporphyrin.

12. Mixture according to claim 9, in which said reducing agent is a chelating agent.

13. Mixture according to claim 9, in which said reducing agent is a member selected from the group consisting of triethanolamine, hydroxyethylenediamine, bis (hydroxy ethyl) glycine, ethylenediamine, ethylenediamine tetracetic acid, ethylenediamine triacetic acid, diethylene-triamine-pentacetic acid, 1, 2-diaminocyclohexane tetracetic acid, hydroxy ethyl tris (hydroxypropyl) ethlylenediamine ammonia-diacetic acid, methylaminodiacetic acid, N-phenylglycine and oxalic acid.

14. Mixture according to claim 9, in the form of a layer on a flat backing.

15. Mixture according to claim 9, in the form of a layer on a flat etchable metal surface.

16. Mixture according to claim 9, containing at least three photo-reducible dyes, each having an absorption maximum for a different primary color.

17. Mixture according to claim 9 on a flat surface, containing at least three photo-reducible dyes, each having an absorption maximum for a different primary color and present in the form closely spaced independent out-of-register dots.

References Cited in the file of this patent

UNITED STATES PATENTS

| | | |
|---|---|---|
| 1,453,259 | John | Apr. 24, 1923 |
| 1,833,161 | Helfrich | Nov. 24, 1931 |
| 2,122,404 | Bloom | July 5, 1938 |
| 2,666,701 | West | Jan. 19, 1954 |
| 2,716,060 | Lupo | Aug. 23, 1955 |
| 2,875,047 | Oster | Feb. 24, 1959 |
| 2,921,852 | Caton | Jan. 19, 1960 |
| 2,950,195 | Hodgins et al. | Aug. 23, 1960 |

OTHER REFERENCES

Clerc: Photography, Theory and Practice; 2 ed. 1937, Pillman Sons, New York, pp. 413–418.

Oster: Photographic Engineering, vol. 4, No. 3 (1953), pp. 176.

UNITED STATES PATENT OFFICE
CERTIFICATE OF CORRECTION

Patent No. 3,074,794 January 22, 1963

Gisela K. Oster et al.

It is hereby certified that error appears in the above numbered patent requiring correction and that the said Letters Patent should read as corrected below.

Column 1, line 19, for "poly vinyl" read -- polyvinyl --; column 2, line 56, for "tetra-actic" read -- tetra-acetic --; column 7, line 15, for "consisting or" read -- consisting of --; line 18, for "1, 2-diaminocyeclo" read -- 1,2-diaminocyclo --; line 37, strike out "substantially only" and insert the same after "reduce" in line 38, same column 7; column 8, line 15, for "ethlylene-" read -- ethylene- --; line 47, for "pp. 176." read -- p. 176 --.

Signed and sealed this 3rd day of September 1963.

(SEAL)
Attest:

ERNEST W. SWIDER
Attesting Officer

DAVID L. LADD
Commissioner of Patents